United States Patent [19]

Roldness et al.

[11] 4,318,649
[45] Mar. 9, 1982

[54] LOCKING MECHANISM FOR B DECK OF AUTO-RACK RAILWAY CAR

[75] Inventors: David J. Roldness; Jerry L. Archambeault, both of San Diego; Robert L. Barkhimer, Chula Vista, all of Calif.

[73] Assignee: Pullman Incorporated, Chicago, Ill.

[21] Appl. No.: 140,902

[22] Filed: Apr. 16, 1980

[51] Int. Cl.³ ............................................. B61D 3/02
[52] U.S. Cl. ........................................ 410/27; 410/29
[58] Field of Search ..................... 410/14, 15, 26, 27, 410/29

[56] References Cited

U.S. PATENT DOCUMENTS

| | | | |
|---|---|---|---|
| 2,802,429 | 8/1957 | Storch | 410/15 |
| 3,240,167 | 3/1966 | Podesta et al. | 410/26 |
| 3,426,704 | 2/1969 | Blunden | 410/27 |
| 3,866,543 | 2/1975 | Richard | 410/27 |
| 3,927,621 | 2/1975 | Skeltis et al. | 410/29 |
| 4,059,055 | 11/1977 | Ravani et al. | 410/29 |
| 4,119,042 | 10/1978 | Naves et al. | 410/27 |
| 4,149,472 | 4/1979 | Naves et al. | 410/27 |
| 4,238,168 | 12/1980 | Naves | 410/27 |
| 4,252,482 | 2/1981 | Naves | 410/27 |

*Primary Examiner*—Richard A. Bertsch
*Attorney, Agent, or Firm*—Paul A. Kerstein

[57] ABSTRACT

An automatic locking mechanism is provided for latching the swingable "B" deck of an auto-rack railway car in either an upper raised position or a lower horizontal position. A spring biased plunger or bolt is normally positioned in locking engagement with a depending striker plate on the end of the swingable deck portion and may be withdrawn by the operator and rotated to a release position in which it is held out of engagement with the striker plate to permit the deck portion to be raised to its upper position. As the deck portion is raised a lug on the striker plate engages a transversely extending rotator pin on the end of the plunger and rotates the plunger away from its release position so that the plunger is automatically returned to a locking position beneath the bottom edge of the striker plate when the "B" deck portion is moved to its raised position.

To return the deck portion to a horizontal position, the plunger is withdrawn by the operator and rotated to the release position. As the deck portion is moved downwardly another lug on the striker plate engages the rotator pin on the plunger and automatically moves the plunger away from its release position so that the plunger is moved into locking engagement with the striker plate by the biasing spring when the "B" deck is moved to the horizontal position.

8 Claims, 12 Drawing Figures

U.S. Patent  Mar. 9, 1982  Sheet 1 of 5  4,318,649
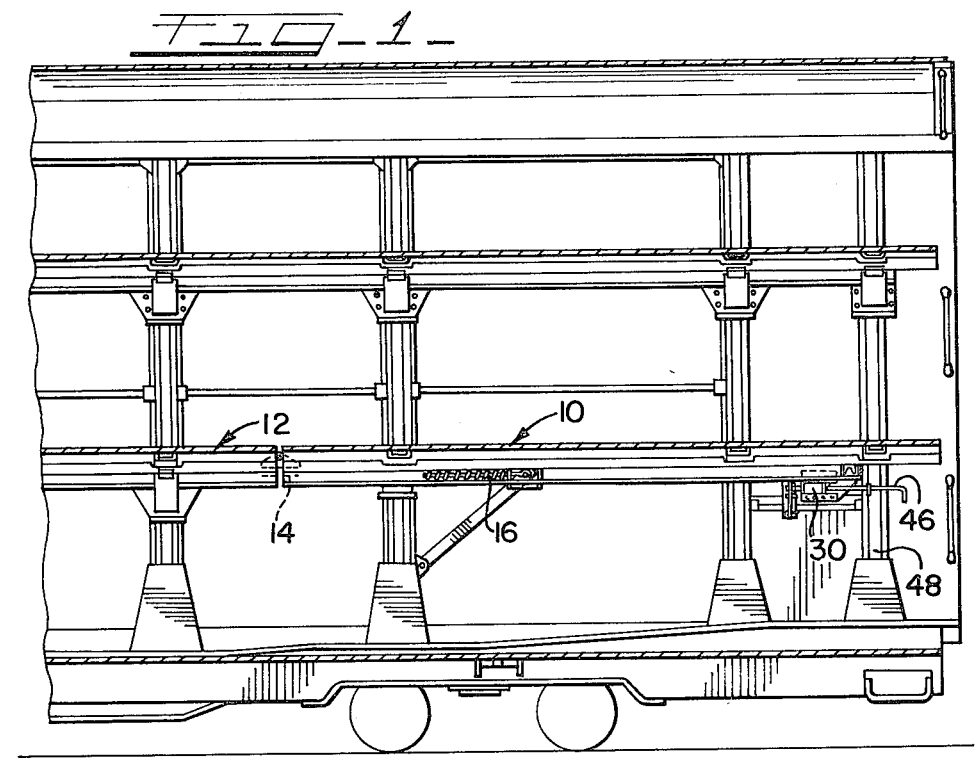
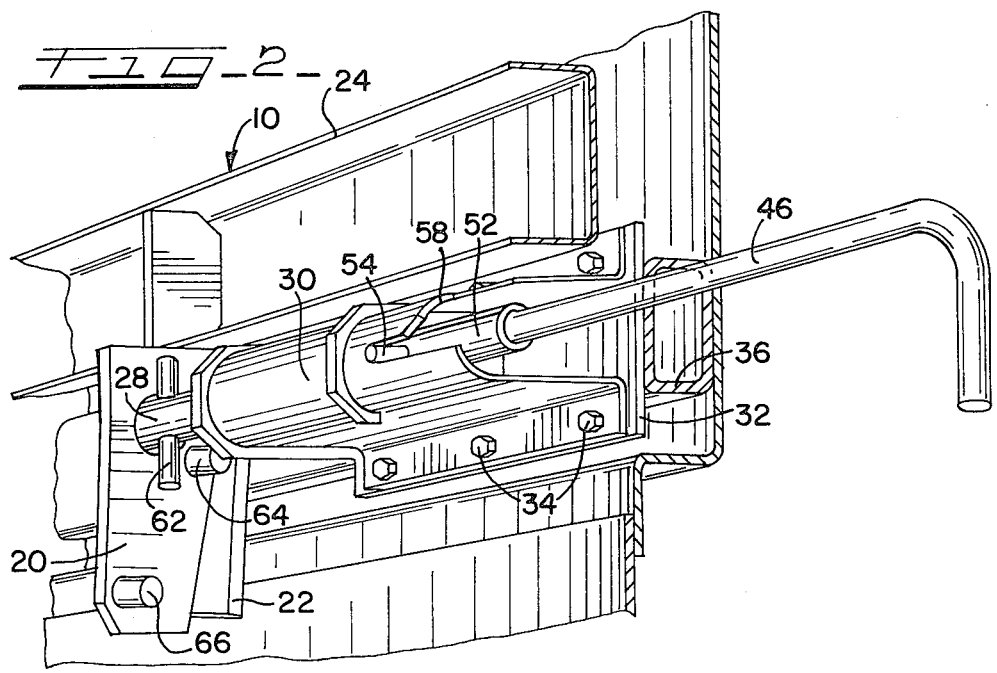

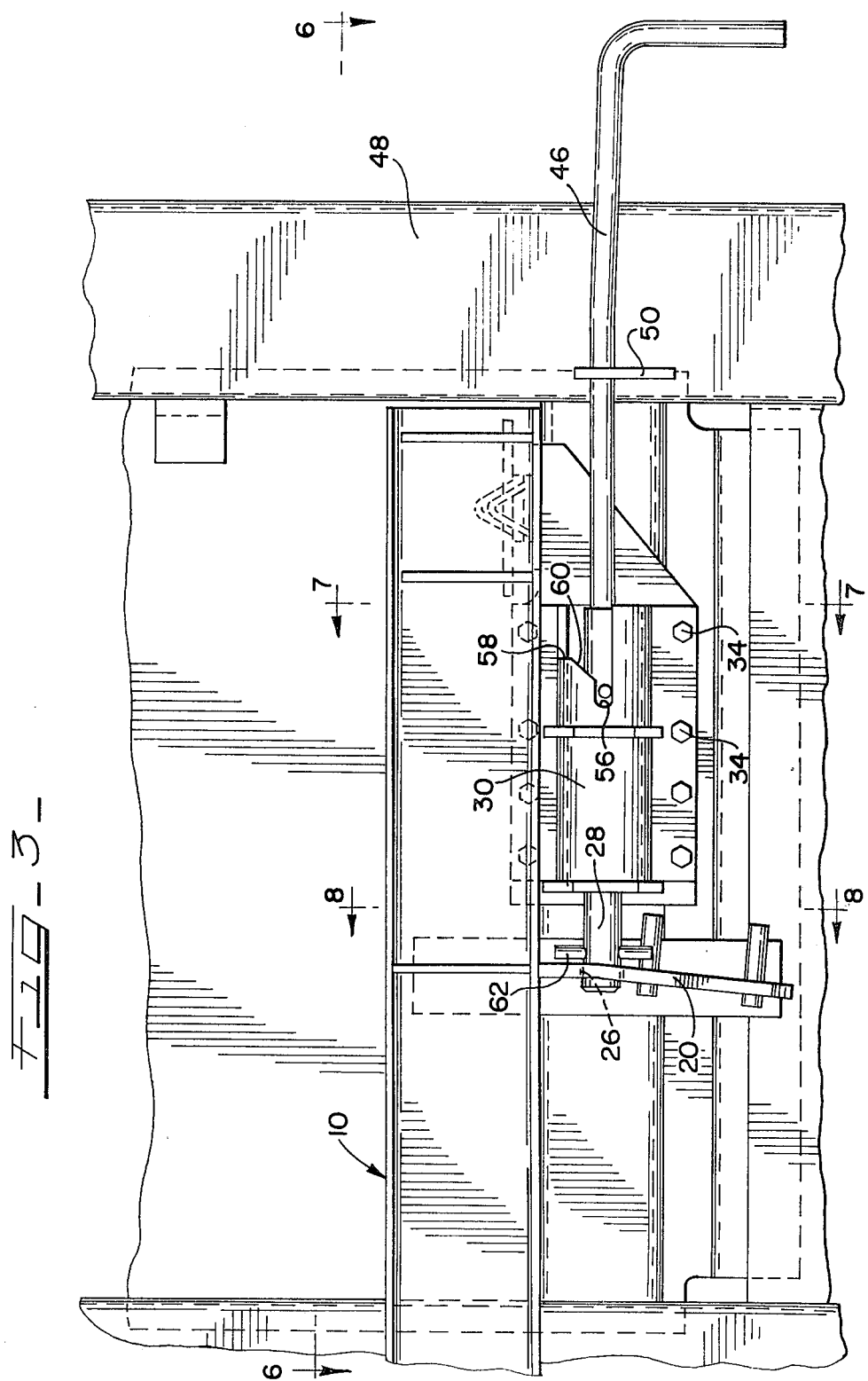

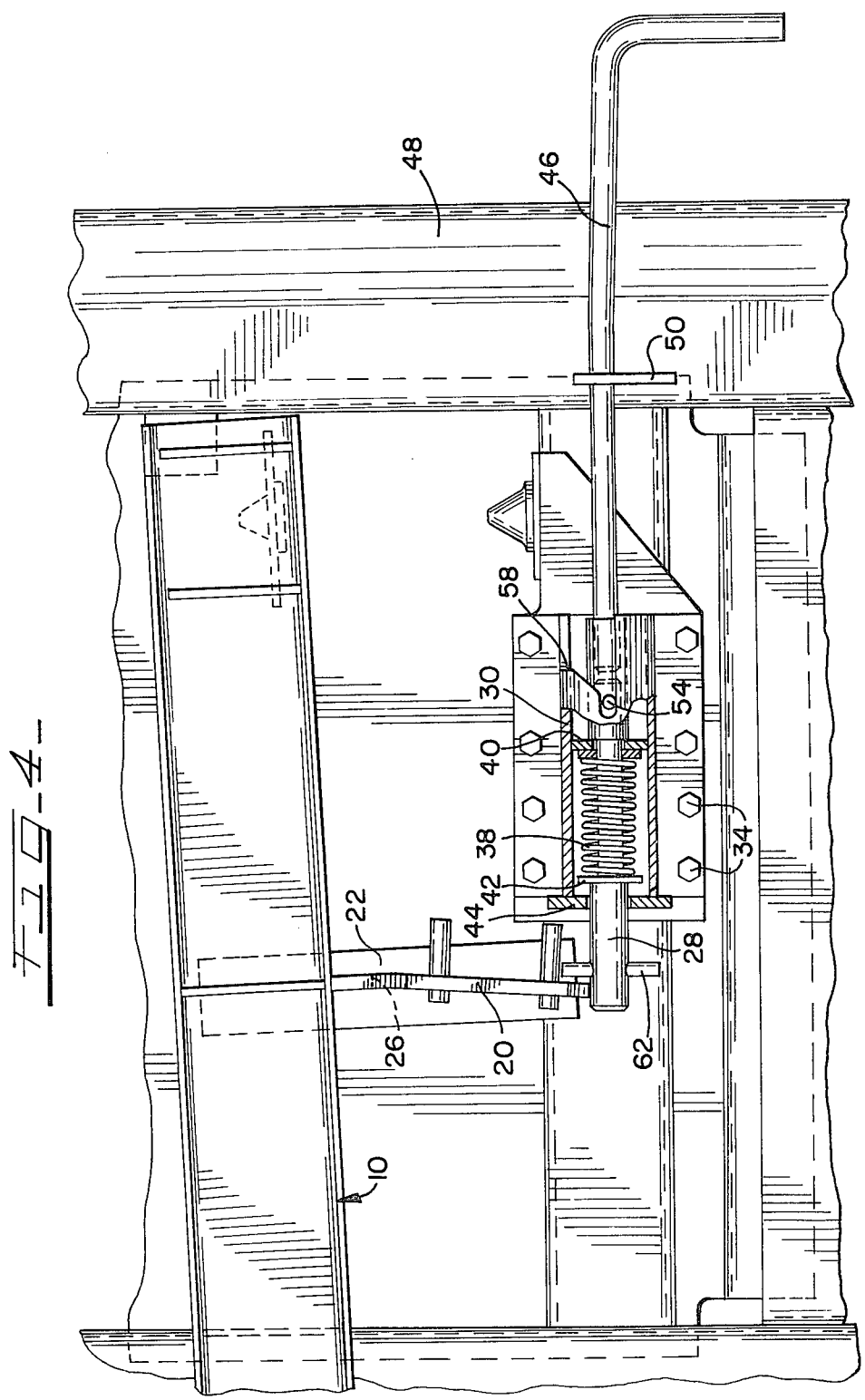

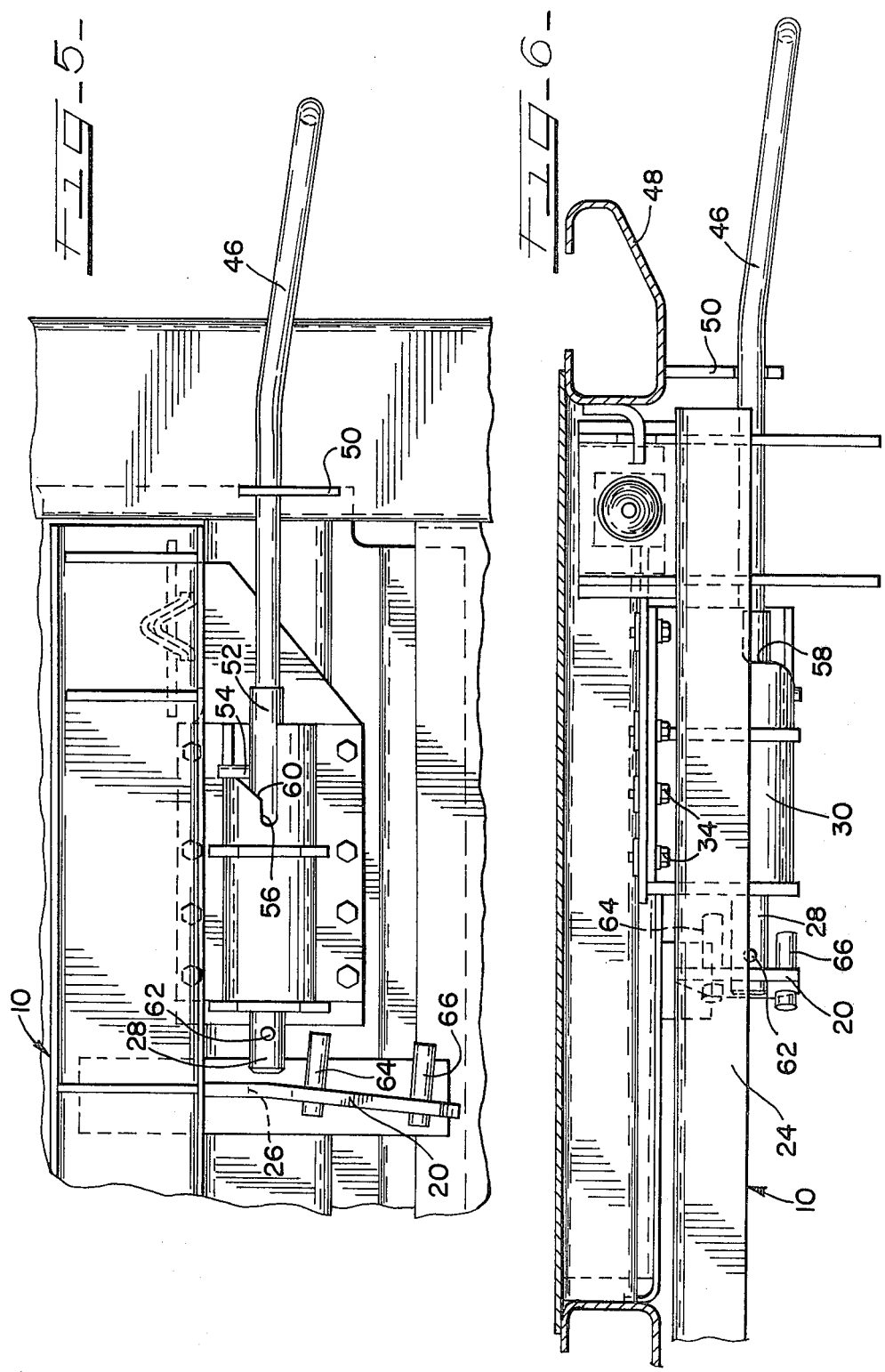

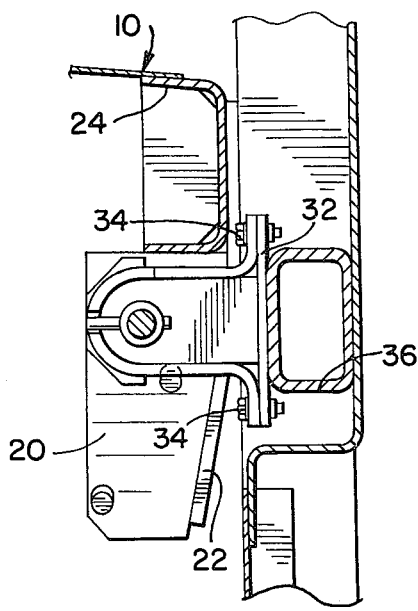
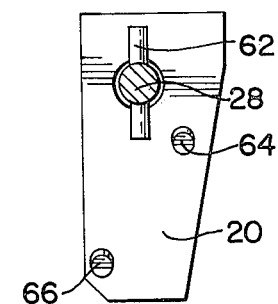
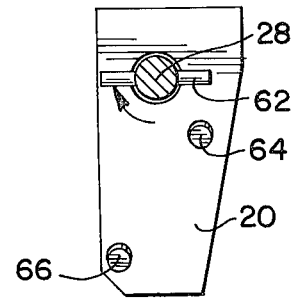
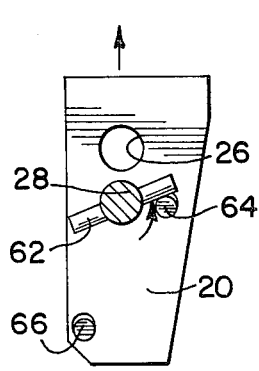
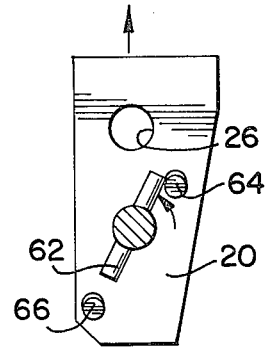
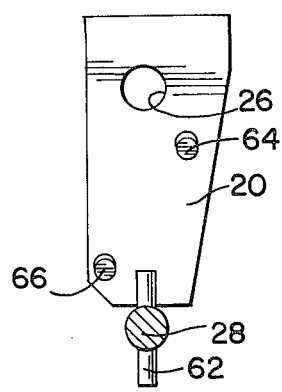

LOCKING MECHANISM FOR B DECK OF AUTO-RACK RAILWAY CAR

BACKGROUND OF THE INVENTION

1. Field of the Invention

The present invention relates to multi-level auto-rack railway cars, and more particularly, to a locking mechanism for automatically latching the swingable "B" deck portion of an auto-rack railway car in either a raised or lowered position.

2. Description of the Prior Art

One type of locking arrangement for the "B" deck of an auto-rack railway car is shown in Blunden U.S. Pat. No. 3,426,704. However, the arrangement of the Blunden patent depends upon the force of gravity for its operation, particularly with respect to the return of the latching member from a release position to a locking position.

Storch U.S. Pat. No. 2,802,429 is directed to a loading mechanism employing an L-shaped locking member. However, the Storch patent has no means for automatically returning the L-shaped member to a locking position in response to movement of the deck.

Ravani et al U.S. Pat. No. 4,059,055 and Skeltis et al U.S. Pat. No. 3,927,621 are also directed to multi-level auto rack railway cars in which a locking mechanism is provided to lock the hinged deck section in either an elevated or lowered position.

Richard U.S. Pat. No. 2,866,543 discloses a gravity operated hanging cam arrangement for a swing deck locking device.

SUMMARY OF THE INVENTION

The present invention pertains to a locking mechanism for the "B" deck of an auto-rack railway car of the type wherein the center or "B" deck is provided with a hinged section which can be moved between raised and lowered positions to facilitate loading and unloading of the railway car. This locking mechanism comprises a simple plunger which is spring biased into a locking position to retain the "B" deck in either a raised or lowered position relative to the sidewall. To operate from either the raised or lowered position, the plunger is moved out of engagement with the deck against the force of the biasing spring and is rotated ninety degrees clockwise, in which position it is held by engagement with a shoulder on the frame. The operator is now free to make a similar disengagement of the plunger on the opposite side of the deck. Rotating the plunger ninety degrees locks the plunger out of engagement with the deck. As the deck is moved to the desired location an arm on the plunger contacts a pin on the deck plate which causes the plunger to rotate ninety degrees clockwise (back to its original position) and the biasing spring forces the plunger into the locking hole on the deck plate when it has been moved to the closed position. This allows automatic engagement so that the deck becomes locked in the desired position. A similar action takes place when the deck is raised to its upper position in which position the plunger is spring biased beneath the bottom of the deck plate and holds the "B" deck in its uppermost position.

BRIEF DESCRIPTION OF THE DRAWINGS

FIG. 1 is a side elevational view of a multi-level auto-rack railway car embodying the locking mechanism of the present invention;

FIG. 2 is an enlarged perspective view of the locking mechanism of FIG. 1;

FIG. 3 is an enlarged side elevational view of the locking mechanism of the railway car of FIG. 1 showing the hinged "B" deck of the car in its lowered position;

FIG. 4 is a side elevational view similar to FIG. 3 but showing the hinged "B" deck in its upper position;

FIG. 5 is a view similar to FIG. 3 with the "B" deck in its lowered position but showing the locking plunger in its released position in which position the "B" deck is free to be raised to its upper position;

FIG. 6 is a sectional view taken along the line 6—6 of FIG. 3;

FIG. 7 is a sectional view taken along the line 7—7 of FIG. 3;

FIG. 8 is a sectional view taken along the line 8—8 of FIG. 3; and

FIGS. 9 to 12, inclusive, are sectional views similar to FIG. 8 but showing the operation of the locking mechanism of the present invention in automatically returning the plunger to its locking position in response to movement of the "B" deck to its raised or lowered positions.

DESCRIPTION OF THE PREFERRED EMBODIMENT

FIG. 1 discloses a portion of a multi-level auto-rack railway car which includes the hinged so-called "B" deck portion 10 of the car. The deck portion 10 is hingedly connected to the adjacent "B" deck portion 12 by means of the hinges 14 and a suitable counter-balancing arrangement, including the spring 16, is provided so that the "B" deck portion 10 may be readily moved between the lowered position shown in FIGS. 3 and 5 and the raised position shown in FIG. 4.

The locking mechanism of the present invention comprises a depending locking plate 20 which is secured to and movable with the hinged "B" deck portion 10. More particularly, the plate 20 is connected to a right angle stiffening plate 22 which is secured to the channel-shaped side member 24 of the deck portion 10 as best illustrated in FIG. 7.

The depending plate 20 is provided with an aperture 26 which is adapted to receive a spring biased plunger or bolt 28 when the "B" deck portion 10 is in its lowered position in FIG. 3 so that the "B" deck portion is locked in its lowered position when the plunger 28 is in the position shown in FIG. 3.

The plunger 28 is slidably and rotatably mounted in a housing indicated generally at 30, the housing 30 being secured to a plate 32 by means of the bolts 34, as best illustrated in FIG. 7. The plate 32 is in turn secured to the hollow side bar portion 36 of the railway car frame so that the plunger 28 is fixedly positioned relative to the movable deck section 10. In this connection it will be understood that a locking mechanism similar to the one shown in the drawings is provided on the other edge of the hinged "B" deck portion 10.

The plunger 28 is biased forwardly by means of a coil spring 38 which is positioned within the housing 30 between an end wall 40 of the housing and a flange portion 42 formed on the plunger 28, the flange 42 engaging the front end wall 44 of the housing 30 to limit forward travel of the plunger 28. The plunger 28 is connected to an L-shaped handle portion 46 which extends beyond the end of the vertical support member 48 of the railway car so that the handle 46 is readily accessible to an operator. The handle 46 is also journaled in the transverse plate portion 50 which is secured to the vertical support member 48 so as to provide for smooth operation of the plunger between its released and locking position. The handle 46 is connected to the plunger 28 by means of a sleeve coupling member 52 and a transversely extending pin 54 projects outwardly from the sleeve 52 and is adapted to ride in a slot 56 formed in the housing 30. The slot 56 has one side thereof cut away to provide a right-angle locking shoulder 58 which communicates with one side of the slot 56 through the sloping shoulder portion 60.

Considering now the operation of the locking mechanism of the present invention described thus far, when it is desired to release the deck portion 10 from its locked lower position, the handle 46 is grasped by the operator and pulled outwardly and then rotated ninety degrees. During this movement, the plunger 28 is removed from the opening 26 in the plate 20 so that the "B" deck portion 10 is then free to be moved to its upper position. Also, during the ninety-degree rotation of the handle 46, the pin 54 rides along the shoulder 60 and into engagement with the transverse shoulder 58 so that the pin is held in the release position shown in FIG. 5 against the force of the biasing spring 38.

In accordance with an important feature of the present invention, the plunger 28 is provided with a transversely extending pin 62 which projects outwardly on both sides of the plunger 28 near the forward end thereof. Also, the depending plate 20 on the deck portion 10 is provided with the projecting pins 64 and 66 which are positioned to engage the transverse pin 62 and rotate the plunger 28 as the deck portion 10 is moved in either direction between its raised and lowered positions.

More particularly, referring to FIGS. 8 to 12, inclusive, when the "B" deck portion 10 is in its locked lower position shown in FIG. 3, the transversely extending pin 62 extends vertically, as shown in FIG. 8. However, when the plunger 28 is withdrawn from the aperture 26 and rotated ninety degrees so that the pin 54 engages the shoulder 58, as shown in FIG. 5, the transversely extending pin 62 on the plunger 28 is positioned horizontally as shown in FIG. 9. When the plunger 28 is in this position, the pin 62 is in the path of the pin 64 on the plate 20. Accordingly, as the "B" deck portion is raised to its upper position the pin 64 engages the transversely extending pin 62 and rotates the plunger 28, as shown in FIG. 10, so that the pin 54 now rides along the inclined shoulder 60 and enters the slot 56, due to the force of the biasing spring 38. The plunger 28 is thus moved forwardly into engagement with the plate 20 as the "B" deck portion continues to move, the pin 62 now being moved to a vertical position when the pin 54 enters the slot 56. When the deck portion 10 is moved to its upper position the bottom edge portion of the plate 20 is positioned above the upper edge of the plunger 28 so that this plunger is permitted to move underneath the plate 20 to the position shown in FIG. 4 so as to lock the deck portion 10 in its raised upper position.

In order to release the deck portion 10 from its locked upper position, the handle 46 is again grasped and moved outwardly and rotated ninety degrees so that the pin 54 again moves into engagement with the shoulder 58 to hold the plunger in a release position in which the transverse pin 62 thereon is positioned horizontally. The deck portion 10 is now free to move downwardly and as it does, the pin 66 will engage the pin 62 on the other side of the plunger 28 and rotate the plunger. When this occurs, the pin 54 again moves down along the shoulder 60 and into the slot 56 under the force of the biasing spring 38. Accordingly, as the "B" deck portion 10 is moved to the lower position, the end of the plunger 28 enters the aperture 26 and locks the deck portion 10 in its lower position.

From the foregoing general description, it will be seen that the locking mechanism of the present invention provides automatic movement of the plunger 28 to the locking position for both the raised and lowered positions of the deck while at the same time permitting the plunger 28 to be held in a released position during movement between these positions. Furthermore, the automatic movement of the plunger 28 to each locking position is under the positive force of the biasing spring 38 and does not rely on the force of gravity as in prior arrangements.

While a preferred embodiment of the invention has been described by way of illustration, many modifications will occur to those skilled in the art. It will be understood, of course, that it is not desired that the invention be limited thereto, since modifications may be made, and it is, therefore, contemplated by the appended claims to cover any such modifications as fall within the true scope and spirit of the invention.

What is claimed as new and desired to be secured by Letters Patent of the United States is:

1. In a multi-level auto-rack railway car, the combination of, a hinged deck section which is swingable between a lower position and an upper position, and a locking mechanism for retaining said hinged deck section in either of said positions;
    said locking mechanism comprising a lock plate connected to said hinged deck section and movable therewith,
    a housing fixedly mounted on said auto-rack car including a plunger slidably and rotatably mounted for movement between a release position in which said plunger is disengaged from said lock plate and a locking position in which said plunger is in interlocking engagement with said lock plate,
    means for biasing said plunger to said locking position;
    means for retaining said plunger in said release position against the force of said; means for biasing; and
    means for disabling said means for retaining said plunger whereby movement of said hinged deck section from either the upper or lower positions moves said plunger to said locking position under the force of said means for biasing.

2. The combination as set forth in claim 1, wherein said plunger is movable between said release and locking positions in a direction generally perpendicular to the direction of movement of said lock plate when said hinged deck section is moved between upper and lower positions.

3. The combination as set forth in claim 2, wherein said lock plate includes an opening therein for receiving said plunger when said plunger is in said locking position.

4. In a multi-level auto-rack railway car, the combination of, a hinged deck section which is swingable between a lower position and an upper position, and a locking mechanism for retaining said hinged deck section in either of said positions;
   said locking mechanism comprising a lock plate connected to said hinged deck section and movable therewith,
   a housing including a plunger within which said plunger is slidably and rotatably mounted and movable between a release position in which said plunger is disengaged from said lock plate and a locking position in which said plunger is in interlocking engagement with said lock plate,
   means for normally biasing said plunger to said locking position,
   said plunger movable in a direction generally perpendicular to the direction of movement of said lock plate when said hinged deck section is moved between upper and lower positions,
   said lock plate having an opening therein for receiving said plunger when said plunger is in said locking position,
   a pin extending transversely from said plunger, and means defining a shoulder on said housing which is engageable by said pin for retaining said plunger in said release position against the force of said means for normally biasing, and
   means responsive to movement of said hinged deck section away from either one of said upper or lower positions for disabling said pin from said shoulder so that said plunger may be moved to said locking position under the force of said means for biasing.

5. The combination as set forth in claim 4, wherein said shoulder is positioned so as to be engageable by said pin only after said plunger has been moved away from said lock plate and rotated about its longitudinal axis.

6. The combination of claim 4, wherein said disabling means comprises cooperating means on said lock plate and said plunger for rotating said plunger by an amount sufficient to move said pin away from said shoulder when said deck section is moved between said lower and upper positions.

7. The combination of claim 6, wherein said cooperating means comprises a projection on said lock plate and offset from the longitudinal axis of said plunger, and a cooperating projection extending transversely from said plunger and positioned in the path of said lock plate projection so as to be engaged thereby upon movement of said deck section.

8. The combination of claim 7, wherein said housing includes a slot within which said pin is positioned when said plunger is in said locking position, and an inclined edge portion on said housing and interconnecting said shoulder and said slot, said pin being urged along said inclined edge by said biasing means after said plunger has been rotated by a predetermined amount by engagement of said projections.

* * * * *